United States Patent Office

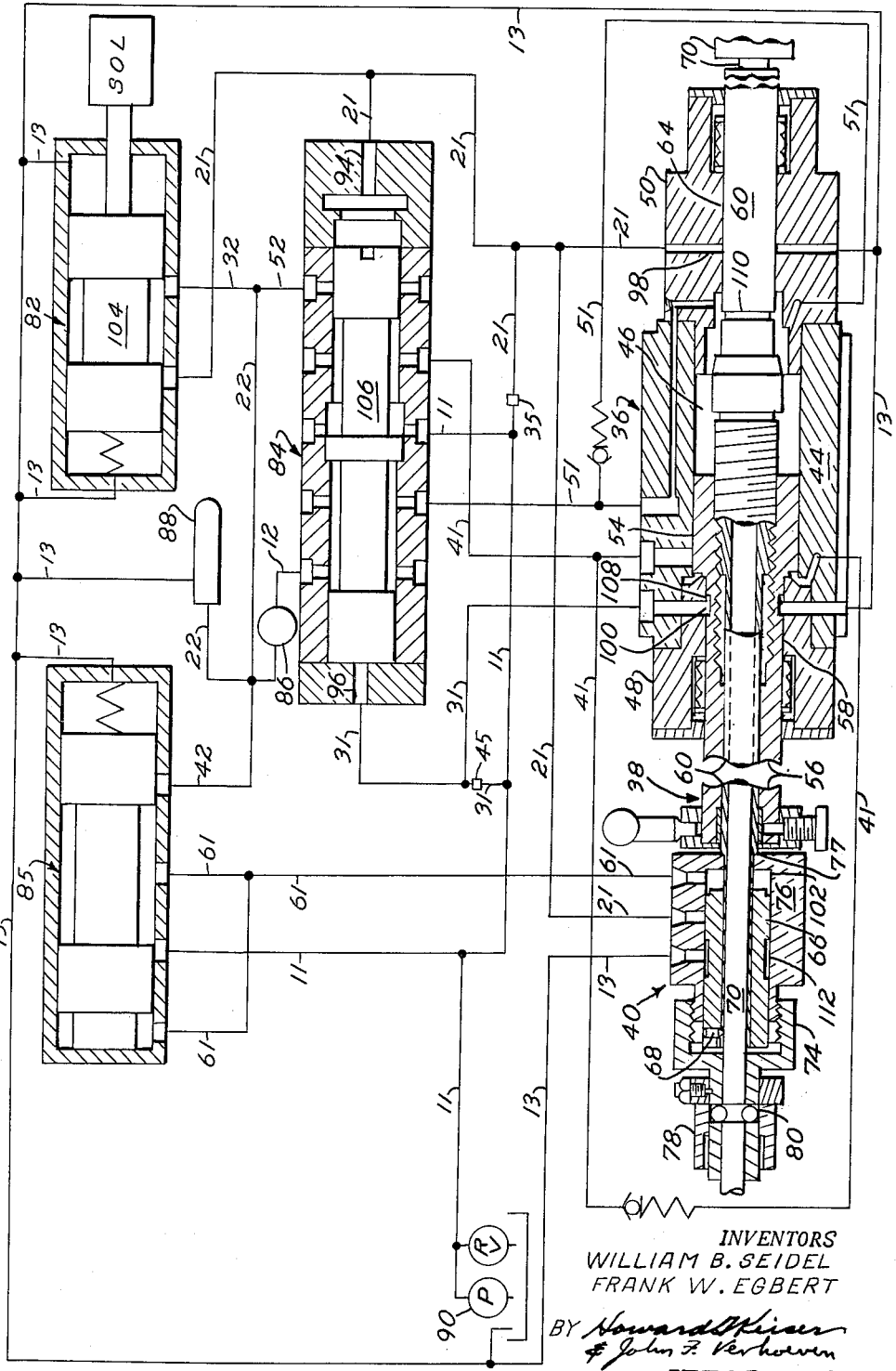

3,009,295
Patented Nov. 21, 1961

3,009,295
MACHINE TOOL LOADING MECHANISM
William B. Seidel and Frank W. Egbert, Cincinnati, Ohio, assignors to The Cincinnati Milling Machine Co., Cincinnati, Ohio, a corporation of Ohio
Filed Apr. 1, 1960, Ser. No. 19,232
9 Claims. (Cl. 51—103)

This invention relates to a workpiece loading mechanism for a machine tool in which the workpieces are automatically consumed by the machine's operational process. It is particularly suited for a through-feed centerless grinding operation.

Efficient loading of workpieces into an operation like through-feed centerless grinding has always been a difficult goal to achieve. If the parts are not loaded into the grinder at a rate which is at least equal to the rate at which the grinding operation can consume them, full advantage is not taken of the machine's capability and operational efficiency is reduced below the optimum level. If parts are loaded at a rate in excess of the normal rate of consumption the pressure from the loading mechanism causes excessive feed which results in erratic sizing and poor surface finish of the completed parts. Moreover, the grinding wheel is adversely affected, its surface requiring normally unnecessary truing and dressing operations.

In a loading device constructed in accordance with the present invention, a mechanism is provided for advancing workpieces into the operating area of a machine. The loading device is sensitive to the resistance of the machine, such as a centerless grinder, to an excessive workpiece loading rate. In brief, in the preferred form of the invention, an adjustable force is used to position a loading ram relative to a driving member which causes the ram to move in a normal, reciprocating, loading stroke. When the magnitude of the force resisting entry of additional parts from the loader into the work area exceeds the magnitude of the positioning force, the ram is retracted before the end of its normal stroke. As long as the resistance to entry exceeds the positioning force, the loading stroke will continue to be interrupted and the ram will automatically return to a starting position and begin its stroke again. When resistance drops to a level below the positioning force normal operation is automatically resumed.

An object of this invention is to provide a mechanism which will load workpieces into a machine tool work area at a rate that results in the most efficient operation of that machine without sacrificing the quality of finished parts.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

FIG. 2 is a sectional view of the loading mechanism actuating unit together with a schematic representation of the hydraulic power and control circuit.

Figure 1:
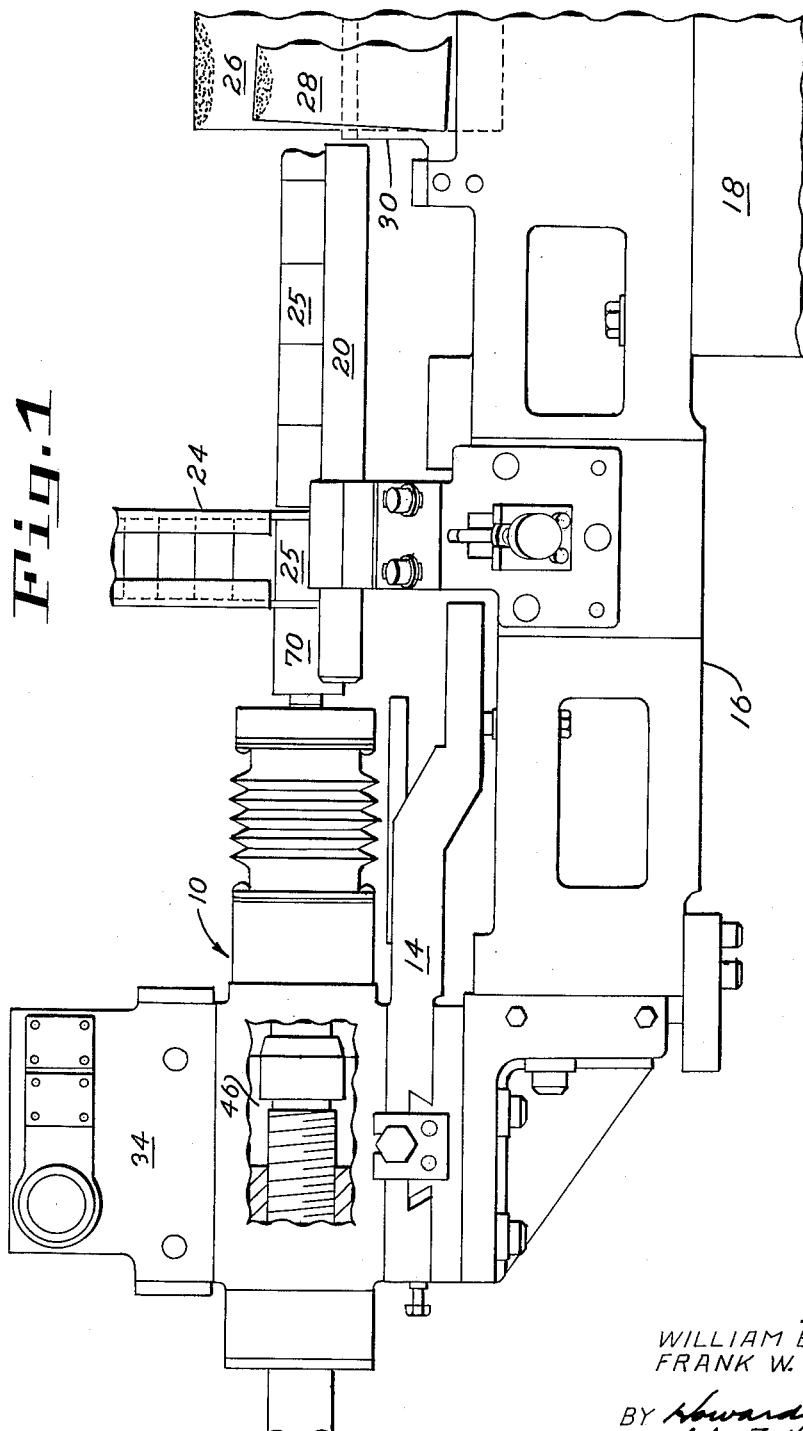
FIG. 1 is an elevational view of the loading mechanism on a centerless grinding machine.

The machine loading attachment as shown in FIG. 1 is comprised of an actuating unit 10 mounted on a horizontal transverse adjusting plate 14 carried by a mounting bracket 16 which is fixed on the grinding machine base 18. The attachment is located so that a pair of spaced horizontal guide bars 20 which define a trough are able to carry workpieces 25 received from a magazine 24 adjacent the guide bars into a grinding area between grinding wheel 26 and regulating wheel 28 as the actuating unit causes workpieces to be pushed along the trough. After the workpieces leave the guide bars, they are supported in the work area by blade support 30.

The actuating unit includes a valve block 34 which encloses the valves of the control circuit. Also included in the actuating unit, as shown in cross section in FIG. 2, are a hydraulic motor 36, a driving member 38 driven by the motor 36, a ram 70 driven by the driving member 38, and an auxiliary valve unit 40.

The hydraulic motor 36 is composed of a cylinder 44, a chamber 46, end portions 48 and 50, and a piston 54 received in the chamber. Received through the piston is the driving member 38, which has a valve sleeve 56 extending from the end of the piston through bore 58 of the rear end portion 48. The driving member 38 also has a drive sleeve 60 received in the valve sleeve 56 and threadedly engaged with piston 54. The sleeve 60 extends both through the valve sleeve 56 and through a bore 64 in the forward end portion 50 of the cylinder. A valve spool 66 is fixed to the rear end of the drive sleeve 60 by pin 68, the spool thereby forming a part of said drive sleeve. A ram 70 having one end adapted to engage a workpiece is slidably received through the sleeve 60. Axially fixed on the ram 70 by an end stop 74 is an auxiliary valve body 76 in which the spool 66 is received. The end stop 74 has a retainer 78 thereon holding balls 80 in contact with ram 70 to furnish axial locking between the ram and auxiliary valve body.

The mechanism control circuit includes a solenoid operated on-off valve 82, a fluid flow reversing valve 84, a pressure reducing valve 85, a rate valve 86, a back pressure relief valve 88, and connecting fluid transmission lines. These lines include a main pressure line 11 connected from a source of fluid under pressure 90, and a main drain line 13 with connecting branches. Various return lines connect to a main return line 22: from the on-off valve 82, line 32; from the pressure reducing valve 85, line 42; and, from the reversing valve 84, lines 52 and 12, line 12 having rate valve 86 included as a part thereof. Main return line 22 connects with the drain line 13 through relief valve 88.

A pair of reversing valve operating lines 21 and 31 are connected between operating ports 94 and 96 respectively in the reversing valve 84, and terminal ports 98 and 100 respectively in the cylinder end bores, with branches containing resistances 35 and 45 connecting each with pressure line 11. Line 21 also has branches to on-off valve 82 and to auxiliary valve body 76. Cylinder supply lines 41 and 51 are connected from the reversing valve 84 to cylinder chamber 46, line 41 to the back end, line 51 to the forward end. A reduced pressure line 61 is connected from the pressure reducing valve 85 to a pressure chamber 102 in the auxiliary valve body 76.

In normal operation, the solenoid of on-off valve 82 is energized and the plunger 104 therein moves to the position shown, blocking the branch of line 21 from connection with return line 32. This allows the valve plunger 106 in reversing valve 84 to operate in its normal reversing manner. The plunger 106 is shiftable from end to end in valve 84 by a pressure differential between operating ports 94 and 96. This pressure differential is due to one only of lines 21 and 31 being selectively connected to drain 13, normally by action of the hydraulic motor 36. The operating port whose operating line is connected to drain is at a lower pressure than the other operating port, and the higher pressure causes plunger 106 to shift toward the lower pressure end of the valve 84. Following the shift, pressure regains a balanced condition and the plunger 106 stays in the shifted position until the reverse unbalance occurs at which time it moves to the opposite end position.

As shown in FIG. 2, the plunger 106 in valve 84 has just moved to the left end since line 31 is connected to drain line 13 through passage 108 of the valve sleeve 56 which, at this time, is opposite terminal port 100. At the same time line 21 is connected only to pressure line 11. The plunger 106 directs the flow of fluid under pressure from line 11 to line 41 which carries the fluid in behind the piston 54 causing it to move to the right, or advance toward the work area. Line 51 from the opposite end of the cylinder chamber 46 is connected through the reversing valve 84, to return line 12 and rate valve 86 which regulates the escape of fluid ahead of the advancing piston. The rate valve 86 makes the advance stroke controllable. As the piston moves, both terminal ports 98 and 100 are block and the reversing valve plunger 106 is stationary. During advance, passage 110 of the drive sleeve 60 is approaching terminal port 98 since the drive sleeve is fixed axially in the piston. When passage 110 and terminal port 98 are opposite each other, line 21 is connected to drain 13 and the pressure differential between operating ports 94 and 96 exists and plunger 106 moves to a position opposite to that shown in FIG. 2. Pressure on the piston ends in chamber 46 is reversed, line 51 now being connected to line 11 through valve 84 and line 41 now being connected to return line 52 which returns fluid to main return 22 at an uncontrolled rate. Therefore, the piston reverses motion and returns to the rear end of the cylinder in a fast retraction stroke, the stroke ending when passage 108 again connects line 31 to drain 13 causing the plunger 106 to shift back to the position shown, at which time the stroke cycle begins again.

The axial spacing of passages 108 and 110 determines the length of stroke of the piston by defining the travel necessary to connect either of lines 21 and 31 to drain line 13. Threaded engagement between piston 54 and drive sleeve 60 is provided to enable adjustment of the relative spacing of the passages 108 and 110 within limits to change the length of stroke. More threaded engagement lengthens the stroke by bringing the passage closer together, requiring more movement to bring them alternately opposite ports 98 and 100. Conversely, less threaded engagement shortens the length of stroke.

While normal operation is going on, a preset reduced pressure fluid from valve 85 is applied through line 61 to chamber 102 in the auxiliary valve body 76. This fluid develops a biasing, or positioning, force within that chamber which tends to expand the chamber and urge the valve body 76, which is fixed on the ram, against shoulder 77 on the sleeve 60, thereby holding, or clamping, the ram 70 in a normally fixed axial relationship with the drive sleeve 60, so that in normal operation the ram is advancing and retracting with the piston 54 and drive sleeve 60. The magazine 24, in which the workpieces 25 are stacked, has a discharge opening over the trough defined by bars 20 and positioned in front of the workpiece engaging end of the ram when the ram is retracted. When the ram is advanced it supports the workpieces in the magazine and with each retraction the ram allows a workpiece to escape from the magazine 24 onto the guide bars 20 at the end of the row of workpieces accumulated in the trough between the magazine and the work area if space is available thereon. Each advance of the ram moves the row of workpieces along the guide bars toward the work area. These workpieces are accepted into the grinding area and are consumed therein at a rate determined by the relationship of grinding and regulating wheels and the surface conditions thereof. When workpieces are pushed in at a rate in excess of the normal acceptance rate a force resisting the ram advance is created. If the ram advancing force is at a level above a predetermined force resisting entry of parts into the grinding area, the grinding operation therein becomes undesirable and inferior grade finished work results. The biasing force in the auxiliary valve is set at a level below that resisting force which occurs when undesirable grinding conditions begin.

The ram is slidable in sleeve 60 against the biasing force in chamber 102 when the resisting force exceeds the preset biasing force during advance of the stroke. The sleeve 60 and piston 54 continue to advance, however, even with excessive resistance, and the ram carrying the auxiliary valve is forced to slide rearward relative to the sleeve 60 and piston 54. The valve spool portion 66 of the sleeve moves forward relative to the auxiliary valve body 76 and the passage 112 on valve spool 66 connects a branch of line 21 to drain 13 whereupon a pressure differential exists between ports 94 and 96 causing the plunger 106 in reversing valve 84 to assume a position bringing about a premature retraction stroke of the piston and sleeve before normal reversing conditions occur. The retraction of the piston causes the ram to retract since the biasing force urging the valve body on the ram against the driving sleeve is unopposed during retraction. Normal operation resumes automatically after the premature retraction and if on succeeding advancement strokes, the resistance is again excessive, an interruption or series of interruptions will occur until resistance drops to a normal level.

Once the machine is started in operation, the loading cycle is fully automatic insuring that a constant flow of parts is directed into the grinding area at a rate not in excess of a rate causing inferior grade finished workpieces.

What is claimed is:

1. In a machine tool loading mechanism to move workpieces successively into an operating area comprising in combination, a driving member, means reciprocating the driving member for advancement toward and retraction from said operating area, a ram adapted to engage a workpiece, means defining a predetermined biasing force between the ram and the reciprocating driving member normally to clamp said ram for movement with the driving member, said ram shiftable relative to the driving member when the ram encounters a resisting force greater than said biasing force during advancement toward said area, and means immediately responsive to the relative shifting of the ram to the driving member to interrupt the advancement of the driving member and retract said driving member thereby retracting the ram before full advancement toward the operating area.

2. In a machine tool, a loading mechanism to move workpieces successively into an operating area comprising in combination a driving member movable towards and away from said operating area, a control member operable when actuated to reverse said driving member, means operable when the driving member is in an advanced and a retracted position to actuate said control member, a ram adapted to engage a workpiece, means defining a predetermined biasing force between the ram and the driving member normally to hold the ram against the driving member for movement therewith, said ram shiftable against said biasing force and relative to the driving member when the ram encounters a resisting force greater than said biasing force during advancement of the driving member toward said area, means immediately responsive to the shifting of the ram relative to the driving member to actuate the control member thereby retracting the driving member and the ram before full advancement toward the operating area, and a magazine adjacent the ram to supply parts thereto as the ram retracts.

3. In a centerless grinding machine having a source of hydraulic fluid under pressure, a loading mechanism to move workpieces successively into the grinding area comprising in combination, a driving member, a hydraulic motor connected to the driving member to move said member towards and away from the grinding area, a hydraulic reversing valve in communication with the motor and the source of fluid under pressure operable to reverse the direction of travel of said driving member when actuated, means to actuate said reversing valve when the driving member is at a predetermined advanced position and when the driving member is at a predetermined retracted position, a ram slidably engaged with the driving member and adapted to engage a workpiece, means defining a predetermined biasing force between the ram and the driving member normally to hold the ram against the driving member for movement therewith, said ram shiftable relative to said driving member against said biasing force when the ram encounters a resisting force greater than said biasing force during advancement of the driving member toward said grinding area, a hydraulic auxiliary valve in communication with said reversing valve, said auxiliary valve responsive to relative movement between said ram and said driving member during advancement of the driving member to actuate said reversing valve thereby to retract said driving member and said ram, and a magazine adjacent the ram to supply workpieces thereto when the driving member is in the retracted position.

4. In a centerless grinding machine adapted for through-feed grinding, the grinding operation resisting movement of the workpiece into the grinding area at an excessive rate, said machine having a source of hydraulic fluid under pressure, a workpiece actuating member for a loading mechanism comprising, in combination: a hydraulic cylinder, a piston received in the cylinder and having a bore therein, a reversing valve connected to said source of hydraulic fluid under pressure and to the cylinder, said reversing valve shiftable to port hydraulic fluid under pressure alternately to each end of the cylinder, means operable as the piston reaches predetermined extreme positions in the cylinder to shift the reversing valve and reciprocate the piston, a driving member received in said bore and fixed axially therein to reciprocate with the piston, said driving member extending beyond said cylinder at either end thereof and having one end defining a valve spool, a ram slidably received in said driving member, said ram extending beyond the driving member at each end thereof and having one end adapted to engage a workpiece, an auxiliary valve body connected to the ram and receiving said valve spool, said auxiliary valve body connected to the source of fluid under pressure and operable continuously to provide a hydraulic positioning force between the ram and the driving member normally to carry the ram with the reciprocating driving member, the driving member spool and the ram valve body relatively shifting as the advance of the ram is impeded by resistance exceeding said positioning force encountered by the workpiece, said valve body connected to the reversing valve to shift said reversing valve as the auxiliary valve body and spool are relatively shifted to retract the driving member and ram.

5. In a centerless grinding machine adapted for through-feed grinding in which the grinding operation exerts a force resisting movement of the workpiece into the grinding area at a rate dtermined by the rate of consumption, said machine having a source of hydraulic fluid under pressure, a workpiece actuating member for a loading mechanism comprising in combination: a hydraulic cylinder, a piston received in the cylinder and having a bore therein, a reversing valve connected to said source of hydraulic fluid under pressure and to the cylinder, said reversing valve shiftable to port hydraulic fluid under pressure alternately to each end of the cylinder, means operable as the piston reaches predetermined extreme positions in the cylinder to shift the reversing valve and reciprocate the piston, a driving member received in said bore and fixed axially therein to reciprocate with the piston, said driving member extending beyond said cylinder at either end thereof and having one end defining a valve spool, a ram slidably received in said driving member, said ram extending beyond the driving member at each end thereof and having one end adapted to engage a workpiece, an adjustable pressure reducing valve connected to the source of fluid under pressure, an auxiliary valve body connected to the ram and receiving said spool, said valve body and spool defining a chamber expandable to urge the valve body into engagement with the driving member, said chamber in communication with the pressure reducing valve to define a predetermined biasing force in the chamber normally urging the valve body into engagment with the driving member and opposing the resisting force of the grinding operation on the workpiece transmitted through said ram as said workpiece is advanced into the grinding area, said valve body connected to the reversing valve to shift said reversing valve when said chamber contracts as the driving member and piston advance at a rate producing a resisting force greater than said biasing force.

6. In a centerless grinding machine adapted for through-feed grinding, the grinding operation resisting movement of the workpiece into the grinding area at an excessive rate, said machine having a source of hydraulic fluid under pressure, a workpiece actuating member for a loading mechanism comprising, in combination: a hydraulic cylinder, a piston received in the cylinder, a reversing valve connected to said source of hydraulic fluid under pressure and to the cylinder, said reversing valve having a pair of operating ports and a plunger shiftable in response to a pressure differential at said operating ports to port hydraulic fluid under pressure alternately to each end of the cylinder, a pair of reversing valve operating lines connected to the reversing valve operating ports and having a pressure differential therein when one only of said lines is blocked to produce a pressure differential at said ports, a driving member received in said piston and fixed axially therein, said driving member extending beyond said cylinder at either end defining a valve spool, said driving member blocking one only of said operating lines when the piston is moved to one position to shift the reversing valve and blocking the other of said operating lines only when the piston is moved to a second position to shift the reversing valve, a ram slidably received in said driving member, said ram extending beyond the driving member at each end thereof and having one end adapted to engage a workpiece, an auxiliary valve body connected to the ram and receiving said valve spool, said auxiliary valve body connected to the source of fluid under pressure and operable continuously to provide a hydraulic positioning force between the ram and the driving member normally to carry the ram with the reciprocating driving member, the driving member valve spool and the ram valve body relatively shifting as the advance of the ram is impeded by resistance exceeding said positioning force encountered by the workpiece, said auxiliary valve body connected to the reversing valve to shift said reversing valve as the auxiliary valve body and valve spool are relatively shifted to retract the driving member and ram.

7. In a centerless grinding machine adapted for through-feed grinding, the grinding operation resisting movement of the workpiece into the grinding area at an excessive rate, said machine having a source of hydraulic fluid under pressure, a workpiece actuating member for a loading mechanism comprising, in combination: a hydraulic cylinder, a piston received in the cylinder, a reversing valve connected to said source of hydraulic fluid under pressure and to the cylinder, said reversing valve having a pair of operating ports and a plunger shiftable in response to a pressure differential at said operating ports to port hydraulic fluid under pressure alternately to each end of the cylinder, a pair of reversing valve operating lines connected to the reversing valve operating ports, means defining a pair of spaced apart terminal ports connected to said operating lines, means to produce a pressure differential in said operating lines when one only of said terminal ports is unblocked to produce a pressure differential at said reversing valve operating ports, a drive sleeve received in said piston and fixed axially therein to reciprocate with the piston, said sleeve extending beyond said cylinder at each end thereof and having one end defining a valve spool, said drive sleeve slidably engaged with the terminal port and having a passage to unblock said port when the piston is moved to one position to shift the reversing valve and reverse the piston, a valve sleeve having a passage therein received on the drive sleeve and longitudinally adjustable thereon to adjustably space the passage thereof relative to the drive sleeve passage, said valve sleeve slidably engaged with the other terminal port, said valve sleeve passage unblocking said other terminal port after a selected movement of the piston determined by the spacing of said passages, a ram slidably received in said drive sleeve, said ram extending beyond the drive sleeve at each end thereof and having one end adapted to engage a workpiece, an auxiliary valve body connected to the ram and receiving said spool, said auxiliary valve body connected to the source of fluid under pressure and operable continuously to provide a hydraulic positioning force between the ram and the drive sleeve normally to carry the ram with the drive sleeve, the drive sleeve spool and the auxiliary valve body relatively shifting as the advance of the ram is impeded by resistance exceeding said positioning force encountered by the workpiece, said auxiliary body connected to the reversing valve to shift said reversing valve as the auxiliary valve body and spool are relatively shifted to retract the sleeve and ram.

8. In a centerless grinding machine adapted for through-feed grinding in which the grinding operation exerts a force resisting forward movement of the workpiece into the grinding area at a rate determined by the rate of consumption, said machine having a source of hydraulic fluid under pressure, a loading mechanism comprising in combination: a hydraulic cylinder having a forward and a rear end bore and a forward and a rear port communicating respectively with said bores, a piston received in the cylinder, a reversing valve connected to said source of hydraulic fluid under pressure and to the cylinder, said reversing valve having a pair of operating ports and a plunger shiftable in response to a pressure differential at said operating ports to port hydraulic fluid under pressure alternately to each end of the cylinder and reciprocate the piston, a pair of reversing valve operating lines connected to the reversing valve operating ports and terminating at said cylinder ports, means producing a pressure differential in said operating lines when one only of said cylinder ports is unblocked to produce a pressure differential at said reversing valve operating ports, a drive sleeve received in said piston and fixed axially therein to reciprocate with the piston, said drive sleeve extending through said cylinder end bores and slidably received in the forward end bore, the rear end of said drive sleeve defining a valve spool, said drive sleeve having a passage to unblock the forward cylinder port when the piston is advanced to shift the reversing valve and reverse the piston, a valve sleeve having a passage therein received on the drive sleeve and slidably received in the rear end bore, said valve sleeve longitudinally adjustable on the drive sleeve to adjustably space the passage thereof relative to the drive sleeve passage, said valve sleeve passage unblocking said rear cylinder port after a selected rearward movement of the piston determined by the spacing of said passages, a ram slidably received in said drive sleeve, said ram extending beyond the drive sleeve at each end thereof, the forward end of said ram adapted to engage a workpiece, an adjustable pressure reducing valve connected to the source of fluid under pressure, an auxiliary valve body connected to the ram behind the drive sleeve and receiving said spool, said valve body and spool defining a chamber expandable to urge the valve body into engagement with the drive sleeve, said chamber in communication with the pressure reducing valve to define a predetermined biasing force in the chamber normally urging the valve body forwardly into engagement with the drive sleeve and opposing the resisting force of the grinding operation on the workpiece transmitted through said ram as said workpiece is advanced into the grinding area, said valve body connected to the reversing valve to shift said reversing valve when said chamber contracts as the drive sleeve and piston advance at an excessive rate, and a magazine adapted to contain unoperated workpieces between the retracted position of the ram and the grinding area, said workpieces held in the magazine by the ram in the advanced position and one of said workpieces dropping in front of the ram as the ram retracts.

9. In a centerless grinding machine adapted for through-feed grinding of workpieces in a work area, said machine having a source of hydraulic fluid under pressure, a loading mechanism comprising in combination; a hydraulic cylinder having a forward and a rear end bore and a forward and a rear cylinder port communicating respectively with said bores, a reversing valve connected to said source of fluid under pressure and to the cylinder, said reversing valve having a pair of operating ports and a plunger shiftable in response to a pressure differential at said operating ports to port hydraulic fluid under pressure alternately to each end of the cylinder, a pair of reversing valve operating lines connected to the reversing valve operating ports and terminating at said cylinder ports, means producing a pressure differential in said operating lines when one only of said cylinder ports is unblocked to produce a pressure differential at said reversing valve operating ports, a piston received in said cylinder for reciprocation toward and away from the grinding area in response to alternate porting of fluid under pressure to each end of said cylinder and having a portion extending therefrom through said rear end bore, said portion having a passage to unblock said rear cylinder port after a selected movement of the piston away from the grinding area to a retracted position to shift the reversing valve and reverse the piston, a member received through said forward end bore and adjustably connected to said piston for movement therewith, said member having means adapted to engage a workpiece for movement thereof toward the grinding area and having a passage to unblock said forward cylinder port after the piston has advanced a selected amount toward the grinding area to shift the reversing valve and reverse the piston, said selected amount corresponding to the relative adjustment of said member and said piston, and a magazine between the retracted position of said member and the grinding area, said magazine adapted to contain unoperated workpieces and to release one of said workpieces for each stroke of said member toward the grinding area.

References Cited in the file of this patent
UNITED STATES PATENTS

| | | |
|---|---|---|
| 2,295,342 | Graf | Sept. 8, 1942 |
| 2,364,300 | Koplin | Dec. 5, 1944 |
| 2,412,730 | Hackethorn | Dec. 17, 1946 |
| 2,655,773 | Wetterborg | Oct. 20, 1953 |
| 2,720,734 | Hackethorn | Oct. 18, 1955 |